US012445881B2

(12) United States Patent
Chenumolu (10) Patent No.: US 12,445,881 B2
(45) Date of Patent: *Oct. 14, 2025

(54) ORCHESTRATION OF CLIENT-ACCESSIBLE TEST SLICES ON A CELLULAR NETWORK (71) Applicant: DISH Wireless L.L.C., Littleton, CO (US)

(72) Inventor: Siddhartha Chenumolu, Ashburn, VA (US)

(73) Assignee: DISH Wireless L.L.C., Littleton, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/770,829

(22) Filed: Jul. 12, 2024

(65) Prior Publication Data
US 2024/0365148 A1 Oct. 31, 2024

Related U.S. Application Data (63) Continuation of application No. 17/550,385, filed on Dec. 14, 2021, now Pat. No. 12,069,494.

(51) Int. Cl.
H04W 24/08 (2009.01)
H04L 67/10 (2022.01)
H04W 84/04 (2009.01)

(52) U.S. Cl.
CPC ............. *H04W 24/08* (2013.01); *H04L 67/10* (2013.01); *H04W 84/042* (2013.01)

(58) Field of Classification Search
CPC . H04W 16/18; H04W 28/0268; H04W 84/18; H04W 24/02; H04W 24/08; H04W 16/14; H04W 48/18; H04W 36/14; H04W 28/0289; H04W 28/24; H04W 48/14; H04L 41/5051; H04L 41/12; H04L 41/5025; H04L 41/40; H04L 67/63; H04L 41/5048; H04L 41/5009; H04L 41/5003; H04L 47/781; H04L 41/142; H04L 41/342

See application file for complete search history.

(56) References Cited

U.S. PATENT DOCUMENTS

| 11,825,532 | B2* | 11/2023 | Bedekar | H04B 7/0452 |
| 2019/0223055 | A1* | 7/2019 | Bor Yaliniz | H04W 24/02 |
| 2020/0014589 | A1* | 1/2020 | Xu | H04L 41/0806 |
| 2020/0383043 | A1* | 12/2020 | Wei | H04W 72/54 |
| 2021/0204198 | A1* | 7/2021 | Xin | H04W 28/0268 |
| 2021/0306938 | A1* | 9/2021 | Seetharaman | H04W 48/18 |
| 2022/0225226 | A1* | 7/2022 | Yang | H04W 28/0268 |
| 2023/0180061 | A1* | 6/2023 | Natarajan | H04W 28/20 |
| | | | | 370/235 |

* cited by examiner

Primary Examiner — Jung Liu
(74) Attorney, Agent, or Firm — Kilpatrick Townsend & Stockton LLP (57) ABSTRACT Various arrangements for creating a slice on a cellular network are detailed herein. A cellular service request that indicates various metrics for a slice may be received. A test function may be created on the cellular network based on the cellular service request. Access to a reduced-scale slice that provides access to the test function for a small set of user equipment (UE) can be provided along with access to key performance indicators (KPIs) for the reduced-scale slice. The reduced-scale slice may then be converted to a production slice that provides access to the network function for a larger set of UE.

20 Claims, 4 Drawing Sheets

ORCHESTRATION OF CLIENT-ACCESSIBLE TEST SLICES ON A CELLULAR NETWORK

CROSS REFERENCE TO RELATED APPLICATIONS

This application is a continuation of U.S. Non-Provisional patent application Ser. No. 17/550,385, filed on Dec. 14, 2021, which is incorporated by reference for all purposes.

BACKGROUND

5G New Radio (NR) cellular networks allow for creation of multiple virtual cellular networks, referred to as slices, to exist simultaneously on the same underlying physical infrastructure and software. Each slice may provide different quality of service (QOS) parameters and quality of experience (QoE) to user equipment (UE) that communicate using the slice. A client may desire particular QoS/QoE parameters be met for the client's UE. To achieve these QoS/QoE parameters, the client may enter into a service level agreement (SLA) with the operator of the cellular network. The operator may create or otherwise assign a particular slice of the cellular network to the client that is configured to provide the requested QoS/QoE parameters.

While such an arrangement may work well if the client is fully aware of the exact QoS/QoE parameters required, the client may not be certain of the exact parameters that are going to be required to achieve the client's goals.

SUMMARY

Various embodiments are described related to a method for creating a slice on a cellular network. In some embodiments, a method for creating a slice on a cellular network is described. The method may comprise receiving, by the cellular network from a client, a cellular service request for the slice. The cellular service request may specify a plurality of performance metrics to be met by the slice. The method may comprise creating, by the cellular network, on a cloud-computing platform, a test function on the cellular network based on the cellular service request. The method may comprise providing, by the cellular network, via a radio access network (RAN) of the cellular network, access to a reduced-scale slice that may provide access to the test function for a first plurality of user equipment (UE) of the client. The method may comprise providing, by the cellular network to the client, access to key performance indicators (KPIs) of the reduced-scale slice. The method may comprise converting, by the cellular network, the reduced-scale slice to a production slice. The production slice may provide access to the cellular network for a second plurality of UE of the client.

Embodiments of such a method may comprise one or more of the following features: the cloud-computing platform may be operated by a separate entity from the RAN. The method may comprise receiving, by the cellular network, from the client, a modified cellular service request for the slice following the KPIs of the reduced-scale slice being provided by the cellular network to the client. The method may further comprise, in response to the modified cellular service request, modifying, by the cellular network, one or more parameters of the reduced-scale slice, the test function, or both. The method may further comprise receiving, by the cellular network a conversion request. The conversion request may request conversion of the reduced-scale slice to the production slice. Conversion of the reduced-scale slice to the production slice may be performed in response to the cellular network receiving the conversion request. Converting the reduced-scale slice to the production slice may comprise maintaining at least the KPIs for the second plurality of UE, the second plurality of UE being greater in number than the first plurality of UE. The method may further comprise accessing, by the cellular network, a test library. The method may further comprise testing, by the cellular network, the test function prior to providing access to the reduced-scale slice. The cellular service request may comprise a service level agreement (SLA) request. The cellular network maybe a 5G New Radio (NR) cellular network.

In some embodiments, a cellular network system is described. The system may comprise a cellular network comprising a plurality of components that may include distribution units, and centralized units. The system may comprise an orchestration system in communication with the plurality of components of the cellular network and functioning as part of the cellular network. The cellular network may be configured to receive a cellular service request for a slice from a client. The cellular service request may specify a plurality of performance metrics to be met by the slice. The system may create a test function on the cellular network based on the cellular service request. The system may provide, via a radio access network (RAN) of the cellular network, access to a reduced-scale slice that may provide access to the test function for a first plurality of user equipment (UE) of the client. The system may provide access to key performance indicators (KPIs) of the reduced-scale slice to the client. The system may convert the reduced-scale slice to a production slice. The production slice may provide access to the cellular network for a second plurality of UE of the client.

Embodiments of such a system may include one or more of the following features: a portion of the cellular network may be executed on a cloud-computing platform operated by an entity distinct from the RAN. The cellular network may be further configured to receive a modified cellular service request from the client for the slice following the KPIs of the reduced-scale slice being provided by the cellular network to the client. The cellular network may be further configured to modify one or more parameters of the reduced-scale slice, the test function, or both in response to the modified cellular service request. The orchestration system may be further configured to receive a conversion request from the client. The conversion request may request conversion of the reduced-scale slice to the production slice. Conversion of the reduced-scale slice to the production slice may be performed in response to the cellular network receiving the conversion request. The cellular network being configured to convert the reduced-scale slice to the production slice may comprise the cellular network maintaining at least the KPIs for the second plurality of UE, the second plurality of UE being greater in number than the first plurality of UE. The cellular network may be further configured to access a test library. The cellular network may be further configured to test the test function prior to providing access to the reduced-scale slice. The cellular service request may comprise a service level agreement (SLA) request. The cellular network may be a 5G New Radio (NR) cellular network.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Embodiments detailed herein are focused on cellular network embodiments in which a portal is exposed to clients, which can be present or potential users of the cellular network who desire for certain service and to have multiple UE connected with the cellular network, that allows the clients to request one or more QoS and/or QoE parameters for the client's UE and/or one or more customized network functions (NFs).

In response to the request, a reduced-scale slice may be provided to the client for access by some of the client's UE. The reduced-scale slice can allow for the client to test and evaluate the client's desired QoS and/or QoE parameters, thus allowing the client to determine whether the desired QoS/QoE parameters (referred to as resource parameters) need to be adjusted to meet the objective or are correct as originally requested. The reduced-scale slice can allow for the client to test whether the desired resource parameters are sufficient for the client's needs. One or more of the resource parameters may be scaled down for the reduced-scale slice. For example, if the reduced-scale slice is to provide service to 500 UE instead of all of the client's 5000 UE, the reduced-scale slice may have only 10% of the total downlink bandwidth that the full production slice will have. However, the downlink bandwidth per UE may be the same on both the reduced-scale slice and the production slice.

While the reduced-scale slice is active, the client may have the ability to monitor the performance of the slice with a dedicated dashboard and review key performance indicators (KPIs) for the slice that are not otherwise released to clients. A KPI represents a quantifiable measure of performance, such as over time, for a specific objective. For example, a KPI could be the latency between an edge server of the client and UE of the client. The client can be provided access to a data lake, or other data storage arrangement, where the KPIs related to the client's reduced-scale slice, NFs, and services are stored. Access to the KPIs can allow the client to confirm that the reduced-scale slice is meeting or exceeding the QoS/QoE parameters indicated by the client in the initial request. Further, the client can perform testing on the client's UE and relevant systems to ensure that the requested and actual QoS/QoE parameters are sufficient to realize the client's needs. If during testing the client desires to refine the QoS/QoE parameters requested, whether to increase performance, to decrease performance or to adjust an NF, the reduced-scale slice can be adjusted and the client can perform further testing, possibly until the client is satisfied with the QoS/QoE parameters and customized NFs. The client may be offered certain network variable knobs that can be modified within a range that is set by the operator.

The test reduced-scale slice can then be converted by the cellular network to a full production slice in response to the client approving the reduced-scale as acceptable. Parameters of the client's request that were scaled down for the reduced-scale slice are scaled up to the full requested scale from the client and the client's remaining UE are permitted access to the modified slice. The production slice can therefore allow for all of the client's desired UE to the access the production slice; the client will observe performance that likely matches the performance seen on the reduced-scale slice. Access to the KPIs may or may not be permitted for the production slice.

Figure 1:
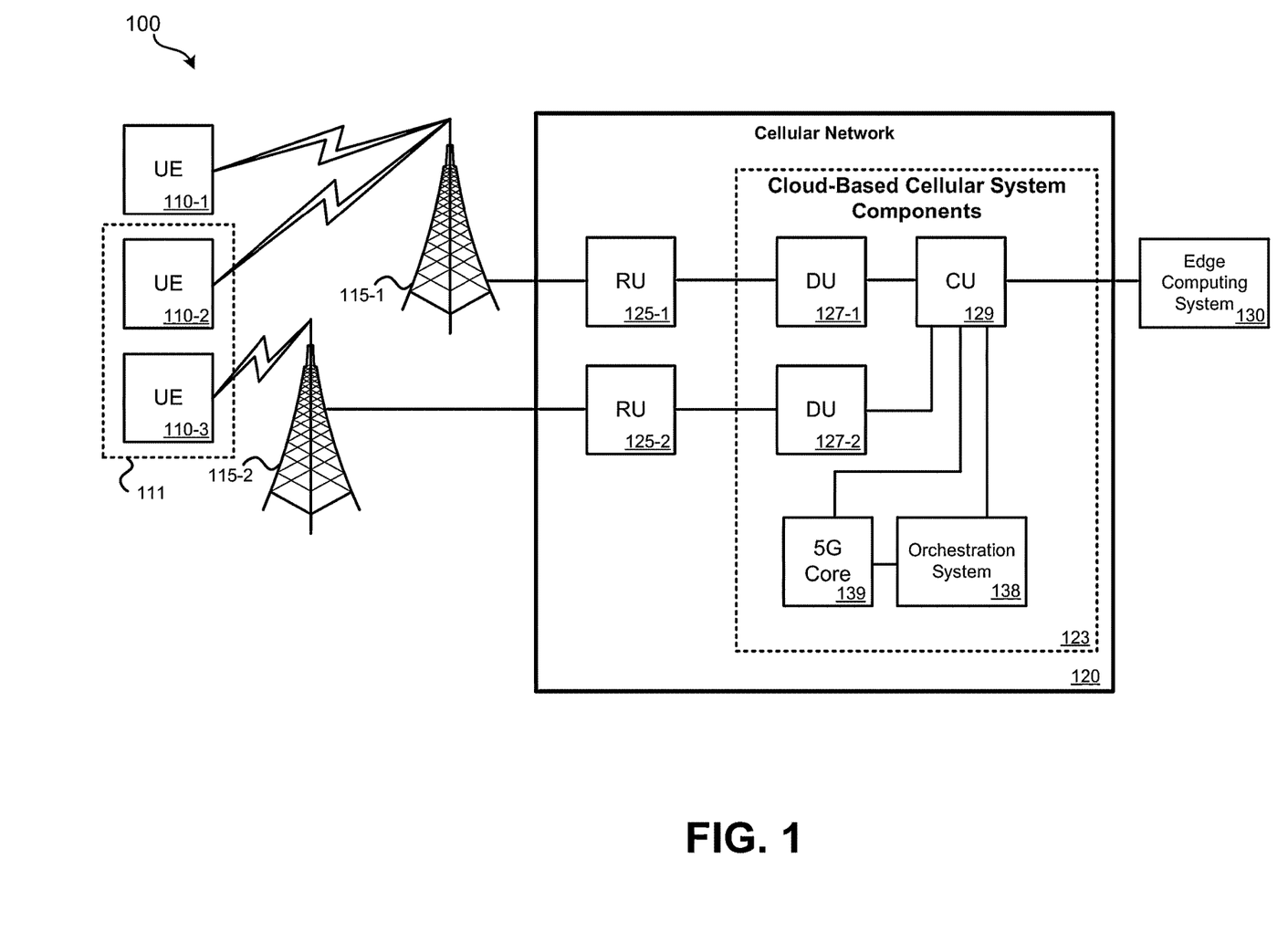
FIG. 1 illustrates an embodiment of a cellular network with a test orchestration system incorporated.

Further detail regarding these and other embodiments is provided in relation to the figures. FIG. 1 illustrates an embodiment of cellular network system 100 with a test orchestration system incorporated. FIG. 1 illustrates an embodiment of a cellular network system 100 (system 100") with an incorporated slice assignment system. System 100 can include a 5G New Radio (NR) cellular network or other types of cellular networks that permit slicing are also possible (e.g., future 6G and beyond cellular networks). System 100 can include: UE 110 (UE 110-1, UE 110-2, UE 110-3); base stations 115 (base station 115-1, base station 116-2); cellular network 120; radio units 125 ("RUs 125"); distributed units 127 ("DUs 127"); centralized unit 129 ("CU 129"); 5G core 139, and orchestration system 138. FIG. 1 represents a component level view. In an open radio access network (O-RAN), because components can be implemented as software in the cloud, except for components that need to receive and transmit RF, the functionality of the various components can be shifted among different servers and/or data centers to accommodate where the functionality of such components is needed and/or where processing, storage, and/or bandwidth are available. For example, DUs 127, CU 129, 5G core 139, and orchestration system 138 can be implemented as cloud-based cellular system components 123 on a cloud-computing platform, such as a cloud-computing platform hosted by another entity (e.g., Amazon Web Services, etc.). In other embodiments, components such as DUs 127, CU 129, 5G core 139, and orchestration system 138 can be implemented as special-purpose software executed on dedicated hardware operated by the cellular network provided or by special-purpose hardware.

UE 110 can represent various types of end-user devices, such as smartphones, cellular phones, cellular modems, cellular-enabled computerized devices, sensor devices, gaming devices, access points (APs), any computerized device capable of communicating via a cellular network, etc. Depending on the location of individual UEs, UE 110 may use RF to communicate with various base stations 115 of cellular network 120. As illustrated, two base stations 115 (BS 115-1, 115-2) are illustrated. Real-world implementations of system 100 can include many (e.g., thousands) of base stations, RUs, DUs, and CUs. BS 115 can include one or more antennas that allow RUs 125 to communicate wirelessly with UEs 110. RUs 125 can represent an edge of cellular network 120 where data is transitioned to wireless communication. The radio access technology (RAT) used by RU 125 may be 5G New Radio (NR), or some other RAT. The remainder of cellular network 120 may be based on an exclusive 5G architecture, a hybrid 4G/5G architecture, a 4G architecture, or some other cellular network architecture that permit slicing. Base station equipment 121 may include an RU (e.g., RU 125-1) and a DU (e.g., DU 127-1).

One or more RUs, such as RU 125-1, may communicate with DU 127-1. As an example, at a possible cell site, three RUs may be present, each connected with the same DU. Different RUs may be present for different portions of the spectrum. For instance, a first RU may operate on the spectrum in the citizens broadcast radio service (CBRS) band while a second RU may operate on a separate portion of the spectrum, such as, for example, band 71. One or more DUs, such as DU 127-1, may communicate with CU 129. Collectively, RUs, DUs, and CUs create a gNodeB, which serves as the radio access network (RAN) of cellular network 120. CU 129 can communicate with 5G core 139. The specific architecture of cellular network 120 can vary by embodiment. Edge cloud server systems outside of cellular network 120 may communicate, either directly, via the Internet, or via some other network, with components of cellular network 120. For example, DU 127-1 may be able to communicate with an edge cloud server system without routing data through CU 129 or 5G core 139. Other DUs may or may not have this capability.

Multiple slices may function on the underlying hardware detailed in FIG. 1. That is, UE 110-1 and UE 110-2, while communicating with the same base station, may be provided with different QoS/QoE levels of service by virtue of these UEs being assigned to different slices. For example, UE 110-2 and 110-3 can be assigned to slice 111, which is represented by a box around these UE, that is reserved for a particular client or group of clients that operate some number of UE. UE 110-1 may be assigned to a general consumer slice or to a slice reserved for another client. Each slice may be associated with differing performance characteristics, which can be defined based on QoS and/or QoE parameters. For each slice, many characteristics or parameters may be defined, such as: downlink/uplink throughput (aggregate for network slice); downlink/uplink throughput (per UE); maximum downlink/uplink throughput; maximum supported packet size; mission critical level (e.g., compared to other network slices); radio spectrum; packet error rate; supported access technologies; supported device velocity for a defined QoS; uplink throughput (aggregate for network slice); maximum uplink throughput; and/or synchronicity. Other parameters for a slice may also be defined, such as: a defined latency range for specific end-points; reserved or shared spectrum; one or more particular security profiles; optimization for specific applications or sets of applications (e.g., healthcare applications, industrial applications); optimization for high-speed mobility; and varying degrees of customer-side control of network parameters. Other parameters may also be defined, such as parameters for individual layers within each network slice. Such individual layers may allow for particular types of data or data associated with particular applications to be prioritized over other applications.

By adjusting such parameters, the user of a UE may experience varying quality of experience for different tasks that a client desires to perform with their UE. For instance, low latency may allow for a high quality gaming experience. Latency may be less important compared to downlink bandwidth if the user desires to stream high-definition video. On cellular network 120, many slices may coexist on the underlying physical cellular network.

While multiple slices may function on the hardware detailed in FIG. 1, not all slices may be available in all geographic regions where cellular network 120 provides service. For example, slice 111 which can provide service to a client's UE may only be available in the geographic region where the client's facilities are located or where the client's UE are expected to be present a majority of the time. If outside the region where the first slice is available, the UE may be assigned to a general consumer slice or to a second slice that is available and is identified as having similar performance characteristics to the first slice.

For particular slices, such as, for example, slice 111, one or more customized NFs and/or services may be made available. A customized network function may be executed for a particular slice as part of 5G core 139 or, more locally, such as at CU 129 or DU 127-1. A customized network function may provide improved service (e.g., lower latency, reduced jitter, greater throughput) than a standard implementation of the NF within the cellular network. An example of a specialized service could be access to an edge computing system, such as edge computing system 130, via a dedicated communication link. While access to the internet may typically be performed via 5G core 139, for a particular slice, to improve performance (e.g., latency, uplink bandwidth, downlink bandwidth), access to edge computing system 130 may be provided via a lower-level component of cellular network 120, such as CU 129. In other embodiments, such access could be provided via a DU of DUs 127. By having a dedicated communication link with edge computing system 130, meeting stringent QoE or QoS parameters for the client's UE may be possible, whereas standard access to the Internet via 5G core 139 would not be sufficient.

Orchestration system 138, at a high level, instantiates virtual components on a cloud-based platform to enable functionality of cellular network 120. When a new slice is to be created, orchestration system 138 can instantiate or modify the necessary virtual components on the cloud-based platform, including components that function as part of 5G core 139, CU 129, and DUs 127. These components may be instantiated with customized parameters and amounts of resources to ensure that the client's desired QoS/QoE parameters are met and the client's customized NFs and/or services are provided. Further detail regarding orchestration system 138 is provided in relation to FIG. 2.

Figure 2:
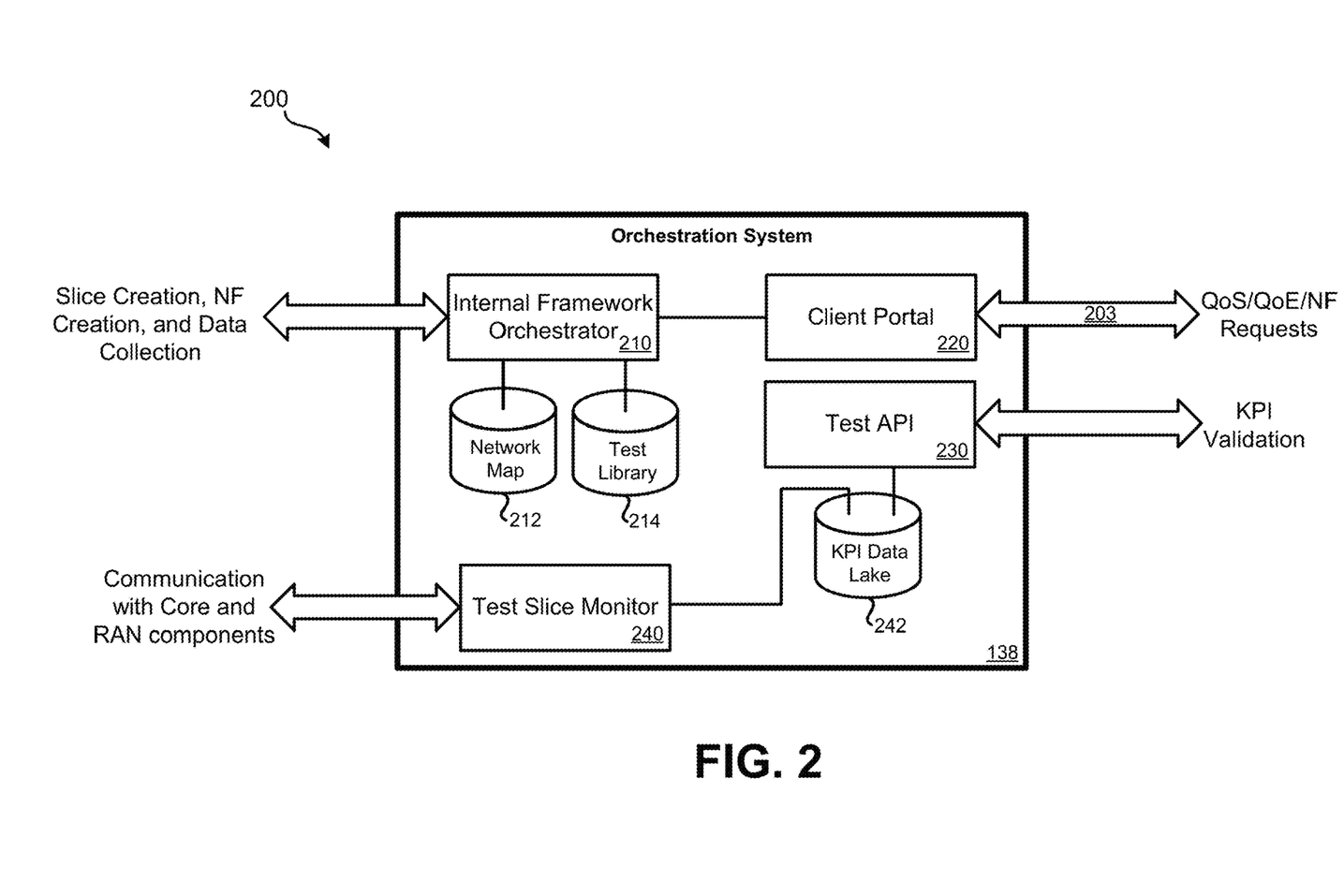
FIG. 2 illustrates an embodiment of the test orchestration system.

FIG. 2 illustrates an embodiment 200 of orchestration system 138. Orchestration system 138 includes various components such as: internal framework orchestrator 210; client portal 220; test application programming interface (API) 230; and test slice monitor 240. Various data storage arrangements can also be present, such as: network map 212; test library 214; and KPI data lake 242. Orchestration system 138 may be executed and stored in the cloud. As such, components of orchestration system 138 may be implemented as part of processes that are remotely executed on a cloud-computing platform, which uses underlying physical hardware that can be shared among different, unrelated entities. In other embodiments, components of orchestration system 138 can be implemented as special-purpose software executed on general-purpose hardware operated by or on behalf of the cellular network provider. In other embodiments, special purpose hardware can be used to perform the functions of orchestration system 138.

Client portal 220 may serve as an interface for clients to request cellular service. Client portal 220 can involve a webpage or other Internet-based interface being made available to clients. Typically, such clients may have multiple UEs for which the client desires to achieve particular QoS parameters, QoE parameters, and/or access certain customized network functions and services. Via client portal 220, a client may provide QoS/QoE/NF/service requests 203. Specifically, the client may specify details such as: the total number of UE; the types of UE; the geographic location(s) in which the UE will be used; identifiers of the UE; QoS parameters; QoE requirements or parameters; desired customized NFs; and/or desired services, etc. The client may also specify how many UE the client desires to use to performance test the cellular network. As a whole, the client's requirements may serve as a basis for an SLA between the cellular service provider and the client. The requirements submitted by the client-to-client portal 220 can be passed to internal framework orchestrator 210 for analysis.

Internal framework orchestrator (IFO) 210 may perform multiple functions, including: 1) assessing whether the cellular network can support all or some parameters of a client's request; 2) modifying the client's request as needed and providing a counterproposal; instantiating/modifying slices, NFs, and services as needed; and 3) performing internal testing and verification of slices, NFs, and services. Initially, IFO 210 may analyze the client's request using network map 212. Network map 212 can indicate the cellular network's resources, such as hardware (e.g., RUs), radio resources (e.g., available spectrum) bandwidth between cellular network components, communication paths, configured and fixed capabilities of the cloud-platform underlying cloud-based components, etc. Network map 212 can also indicate the availability of the cellular network's resources, such as the amount of various resources that are available for use (i.e., not otherwise being used or assigned), possibly at various times. An initial binary determination may be made as to whether the client's request is possible to be met by the cellular network based on network map 212. If the client's request cannot be met in totality, the client may have the option to receive a modified request from IFO 210 via client portal 220 in which some parameters of the client's proposal are modified to parameters that can be met by the cellular network.

In some embodiments, rather than specifying specific QoS parameters, a client may provide a higher-level definition of the services desired. For example, the client may specify that 4K video services are required at 500 UE in a particular geographic area. Internal framework orchestrator 210 may analyze the higher-level definition of services selected by the client and translate the intent to determine appropriate QoS/QoE, NFs, and services needed by the client.

Using network map 212, internal framework orchestrator 210 can determine whether the available resources of the cellular network can support the client's request. If not, a modified request may be created that can be supported by the cellular network and provided to the client for review via client portal 220. Alternatively, modifications to the cellular network may be performed or planned to accommodate some or all of the client's request. A response to client portal 220 by internal framework orchestrator 210 may indicate pricing for the client's request or the provided modified request. In view of the pricing, the client may further modify its request.

If the client desires to proceed with the client's requested parameters or a proposed modified set of parameters, internal framework orchestrator 210 may create or assign a slice that will serve as a reduced-scale slice for the client. By reduced-scale, the slice is only made available to the client for testing purposes using a limited number of UE and not all UE that will utilize the slice if an SLA is transitioned to a production-scale slice. In other embodiments, the slice being reduced-scale for the client could additionally or alternatively involve the slice being available over a limited geographic region compared to the client's desired geographic region indicated in the client request for the full production-scale slice.

Further, certain parameters of the reduced-scale slice can be reduced in scale from the client's request. Therefore, a client's request may indicate the metrics, services, and functions desired in the production phase; these metrics, services, and functions may be scaled down for a test phase depending on a number of UE permitted to be part of the test or a number of UE requested to be included for testing. QoS/QoE parameters for individual UE may be maintained on the reduced-scale slice, but aggregate QoS/QoE parameters may be scaled down based on the number of UE permitted on the test slice compared to the client's total production request. As an example, if the client's production-level request requires a certain total uplink bandwidth across all UE, this total uplink bandwidth may be scaled down based on the number of UE that are permitted to use the reduced-scale slice. Therefore, if a client's request indicates than 10,000 UE will be used to access a desired slice with a per UE uplink bandwidth of at least 1 Mbs and an aggregate uplink bandwidth of 5 Gbs, for a reduced-scale slice that allows for testing of 100 UE, the per UE uplink bandwidth may be maintained at 1 Mbs, but the aggregate uplink bandwidth may be 50 Mbs (1 Gbs/(10000/100).

Prior to making the reduced-scale slice available to the client, internal self-testing may be performed by internal framework orchestrator 210. Internal self-testing can be performed to ensure that the reduced-scale slice will meet the client's requested QoS/QoS requirements, and/or ensure that the client's requested services and/or customized NFs function correctly. To perform testing, various test conditions can be loaded from test library 214 to test the reduced-capacity slice. Such test conditions can simulate traffic on the reduced-scale slice, traffic spikes, and/or problems on the cellular network (e.g., components going off-line, fiber cuts, processing capacity on the cloud-platform being decreased). Under the test conditions, internal framework orchestrator 210 can ensure that the reduced-scale slice will meet the client's requested parameters and that requested services and NFs will operate at a level of performance acceptable under the client's request. In response to the testing, modifications may be made to the reduced-scale slice and/or cellular network such that the client's request or the modified request is met by the reduced-scale slice.

Following testing by IFO 210, the client may be permitted to access the reduced-scale slice. UE of the client that have been granted access to the reduced-scale slice can use cellular network services via the reduced-scale slice to use all NFs and services that were requested within the client request. While testing, the client can perform two primary tasks: 1) determine whether the client's requested parameters (or the modified parameters) are sufficient for the client's needs; and 2) assess whether the reduced-slice is performing in accordance with the client's requested parameters (or the modified parameters).

To accomplish the first point, the client may perform internal testing on the client's systems to ensure that the client's needs are being met. If the client is experiencing problems related to cellular network performance, this may be because the client did not request the correct QoE/QoS/NFs/services from the cellular network provider via client portal 220 or that the reduced-scale slice as provided by the cellular network is not meeting the metrics. To determine the answer, the second point can be analyzed by accessing a KPI data lake 242 (or other form of data storage arrangement)

managed by orchestration system 138. KPI data lake 242 indicates KPIs measured on the cellular network that indicate various performance metrics of the reduced-scale slice. If these metrics indicate the reduced-scale slice is performing in accordance with the client request, then either the client-requested QoS/QoE/NFs/services need to be adjusted by the client or there is another issue with the client's systems.

To access KPI data lake 242, the client may be provided access through test API 230. The client may only be permitted to access KPI data relevant to the client's reduced-scale test slice; access to KPI data related to other clients and other slices may not be provided. KPI data lake 242 may be populated by test slice monitor 240. Test slice monitor 240 can obtain performance data from components with the cellular network, such as DUs, CUs, the 5G core, the client's NF, and the client's services that are used with the reduced-scale slice.

Once the client is satisfied with the reduced-scale slice, the client may submit a request, via client portal 220, to transition to a full production-scale slice. IFO 210 can first scale up the resources of the cellular network devoted to the reduced-scale slice to create a full production slice in accordance with the client's request, then perform a second round of internal testing. Access to the client's other UEs to the now full production slice can then be granted. In some embodiments, before providing access, testing of the full production slice is again performed using test library 214 similar to the initial testing performed on the reduced-scale slice.

Figure 3:
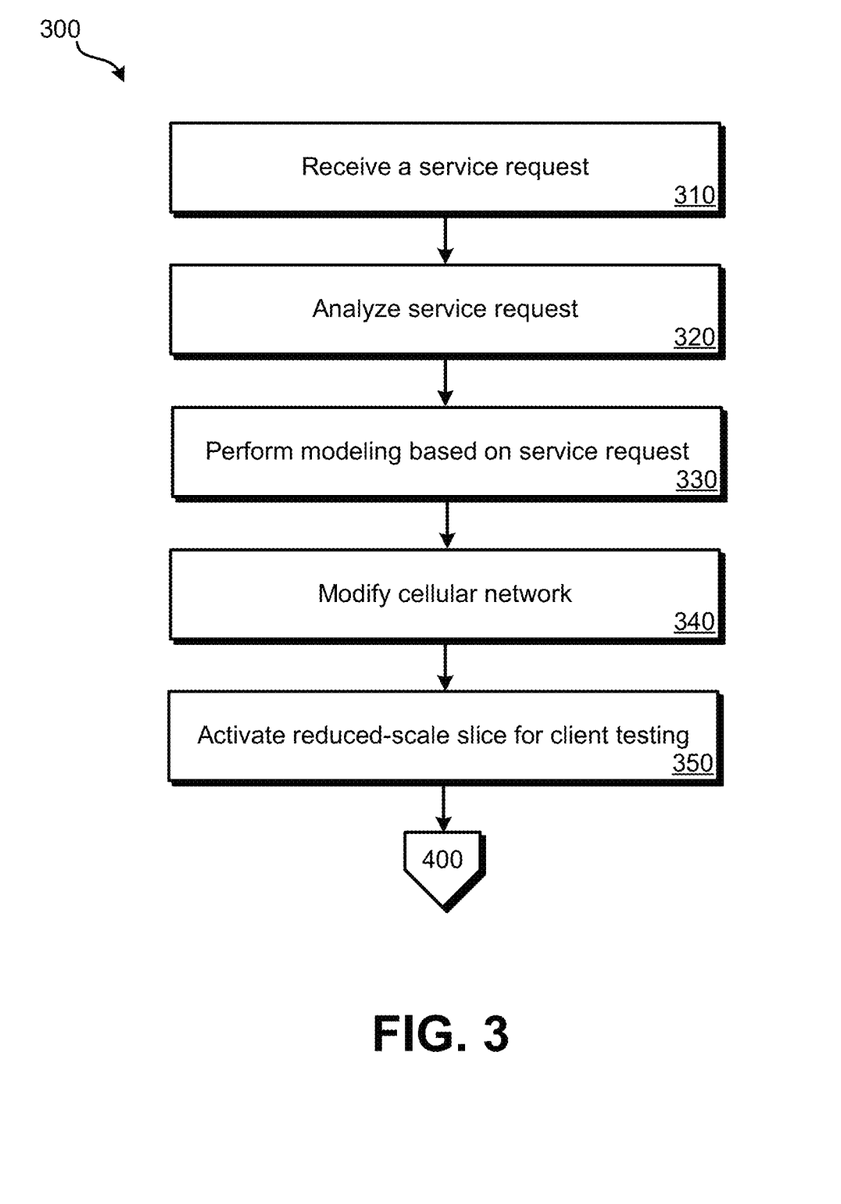
FIG. 3 illustrates an embodiment of a method for performing internal test slice validation.

Various methods may be performed using the systems detailed in relation to FIGS. 1 and 2. FIG. 3 illustrates an embodiment of a method 300 for performing internal test slice validation. Method 300 can be performed using a cellular network, such as a 5G NR cellular network, as detailed in relation to FIG. 1. In some embodiments, an orchestration system that functions as part of the cellular network, or is in communication with a cellular network, can perform method 300, such as detailed in relation to FIG. 2.

At block 310, a service request can be received from a client. A client does not need to be a current customer of the cellular network; rather, a client is a party interested in acquiring cellular network services for multiple UE through the cellular network operator. The service request can indicate: a total number of UE for which service is to be provided; a number or percentage of UE to be tested prior to committing to full-scale service (and possibly identifiers of the UE); a geographic region for service; QoS/QoE parameters; customized NFs; and/or desired services. As detailed in relation to FIG. 2, the service request can be provided via a client portal, which can be accessible via the Internet.

At block 320, the service request received from the client is analyzed. First, a determination is made as to whether the service request can be satisfied by the cellular network as is. If so, feedback may be provided, such as a price and/or timeline for implementation. If the service request cannot be satisfied as a whole, a modified request that meets only some parameters or is otherwise as close as possible to the desired parameter set may be provided in response or a timeline for the cellular network to be updated to be able to satisfy the request. In some situations, a response may be provided indicating that the service request cannot be satisfied. In response to feedback, the client may modify the service request until the client is satisfied with the cost and proposed service (e.g., QoS/QoE/NFs/services).

At block 330, modelling may be performed to ensure that the instantiated components and created or modified scaled-down slice can meet the requirements of the client's service request (as scaled for a smaller group of test UE). As previously detailed, testing, such as using a library of testing scenarios, can be performed. In response to the modeling, the reduced-scale slice, NFs, and/or services may be modified to ensure that the service request is satisfied. The orchestrator may introduce a system load to simulate the test slice using load generators and measure the system performance and monitor the operational impact and SLAs of other slices. Orchestrator may select a time duration to simulate the client service requirement. Based on the data collected during simulation, modifications may be proposed by the system to the client for the slice.

At block 340, the cellular network can be modified such that a slice is created or modified in order to meet the service request. The service request may be met for a reduced number of UE that are to be permitted to test the cellular network service. Therefore, aspects of the service request may be scaled down, such as a total uplink bandwidth and total downlink bandwidth. QoS/QoE parameters provided to individual UE may match the service request. NFs and services, as requested by the service request, may be instantiated on the cellular network for a reduced-scale slice. Since components of the cellular network can be hosted on a cloud-platform, instantiation may be able to be performed without any new hardware being acquired or installed by the cellular network operator.

At block 350, the reduced-scale slice may be made available for client testing via the RAN. All parameters of the client request may be met, except for a reduced number of UE. The number of UE permitted to use the test slice may be set based on agreement between the cellular network operator and the client. In some embodiments, all UE of the client may be permitted to access the reduced-scale slice, but only a limited number of connections are permitted concurrently. In other embodiments, a predefined group of UE (e.g., based on UE identifier) are permitted to access the reduced-scale slice; all other UE of the client are not allowed access to the cellular network or are shunted to a different slice of the cellular network.

Figure 4:
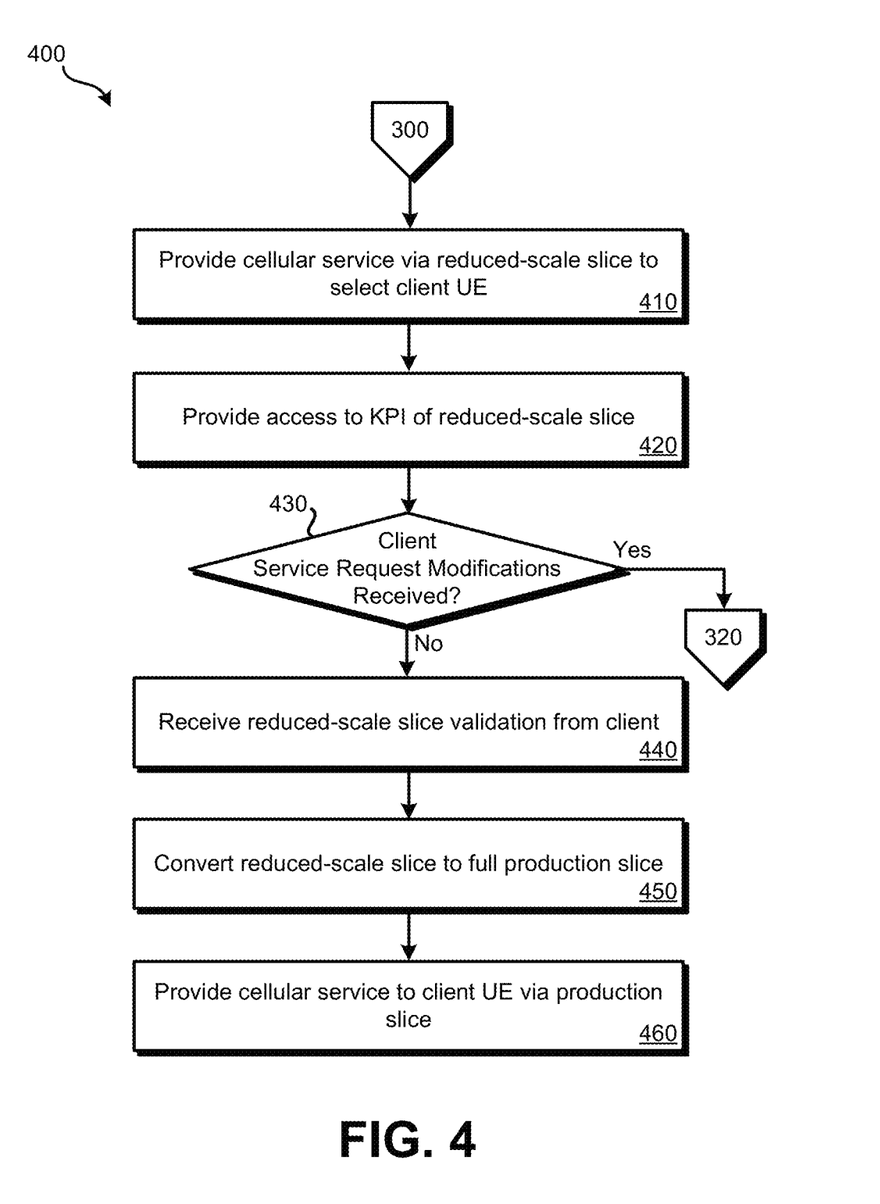
FIG. 4 illustrates an embodiment of a method for performing external testing by a client.

Following method 300, method 400 may be performed in which the reduced-scale slice can be tested externally by the client. FIG. 4 illustrates an embodiment of a method for performing external testing by a client. Method 400 can be performed using a cellular network, such as a 5G NR cellular network, as detailed in relation to FIG. 1. In some embodiments, an orchestration system that functions as part of the cellular network or is in communication with a cellular network, can perform method 400, such as detailed in relation to FIG. 2.

At block 410, UE of the client that are included in the trial receive cellular network service in accordance with the client request. While aggregate aspects of the client request may be decreased, on a per UE basis, performance of the reduced-scale slice should mirror performance of a full production slice being created for the client. At block 410, the client may measure metrics on the client's side to determine if the UE are receiving the service level necessary to perform the tasks desired by the client. If so, the client may desire to decrease aspects of the service request, such as to save money. If not, the client may desire to assess whether the issue is that the client did not request the correct QoS/QoE/NFs/services from the cellular network operator, if the cellular network is not providing the requested level of service, or if some other problem is the cause.

At block 420, the client may access KPI data of the reduced-scale slice. The client can then perform analysis to determine whether or not the reduced-scale slice is satisfying the QoS/QoE parameters and NFs/services indicated in the service request. If the performance observed at UE (or otherwise related to the UE) does not meet the client's expectation, the KPI data will inform the client as to whether the problem lies in the parameters requested by the client or the performance of the cellular network.

At block 430, the client may make modifications to the service request, such as to increase and/or decrease requested QoS/QoE parameters, adjust NFs requested, and/ or adjust requested services. If modifications are requested, method 400 may return to block 320 of method 300 to analyze the modified service request. If modifications are not requested, method 400 may proceed to block 440. At block 440, when the client is satisfied and is ready to transition to using the full production slice, the client may provide a validation input to the cellular network operator, such as via a client portal.

In response to the validation, the cellular network may convert the reduced-scale slice to a full production-scale at block 450. This conversion can involve increasing the aggregate parameters (e.g., total uplink and downlink bandwidth for all UE), processing capabilities, number of instantiations, and/or bandwidth of components that operate on the slice to be able to handle the increased scale of UE in accordance with the change in scale. Following conversion, testing of the full production slice may be performed and the full production slice may be modified as necessary to meet the complete client service request (e.g., SLA).

At block 460, cellular service is provided to all the requested client UE via the full production slice. Due to testing having been performed on the client side using the reduced-scale slice, the client can expect the full production slice to provide the correct QoS/QoE, services, and NFs as needed by the client across all of the client's UE.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method for creating a slice on a cellular network, the method comprising:
    creating, by the cellular network, a test function on the cellular network;
    providing, by the cellular network, access to a reduced-scale slice that provides access to the test function for a first plurality of user equipment (UE);
    receiving validation of the reduced-scale slice from a client; and
    after providing the access to the reduced-scale slice that provides access to the test function for the first plurality of UE and in response to the received validation of the reduced-scale slice from the client, converting, by the cellular network, the reduced-scale slice to a production slice, wherein the production slice provides access to the cellular network for a second plurality of UE.

2. The method for creating the slice on the cellular network of claim 1, further comprising:
    receiving, by the cellular network, a cellular service request, wherein:
        the cellular service request specifies a plurality of performance metrics to be met.

3. The method for creating the slice on the cellular network of claim 2, further comprising creating, by the cellular network, the reduced-scale slice based on the cellular service request.

4. The method for creating the slice on the cellular network of claim 1, further comprising providing, by the cellular network, access to key performance indicators (KPIs) of the reduced-scale slice.

5. The method for creating the slice on the cellular network of claim 4, further comprising:
    receiving, by the cellular network, a modified cellular service request for the slice following the KPIs of the reduced-scale slice being provided.

6. The method for creating the slice on the cellular network of claim 5, further comprising:
    in response to the modified cellular service request, modifying, by the cellular network, one or more parameters of the reduced-scale slice, the test function, or both.

7. The method for creating the slice on the cellular network of claim 1, further comprising receiving, by the cellular network, a conversion request, wherein the conversion request requests conversion of the reduced-scale slice to the production slice.

8. The method for creating the slice on the cellular network of claim 7, wherein conversion of the reduced-scale slice to the production slice is performed in response to the cellular network receiving the conversion request.

9. The method for creating the slice on the cellular network of claim 1, wherein the second plurality of UE being greater in number than the first plurality of UE.

10. The method for creating the slice on the cellular network of claim 1, wherein converting the reduced-scale slice to the production slice comprises at least maintaining one or more KPIs for the second plurality of UE as was provided by the reduced-scale slice for the first plurality of UE.

11. A method for creating a slice on a cellular network, comprising:
creating, by the cellular network, a test function on the cellular network;
accessing, by the cellular network, a test library;
testing, by the cellular network, the test function, using the test library, prior to providing access to a reduced-scale slice;
providing, by the cellular network, access to the reduced-scale slice that provides access to the test function for a first plurality of user equipment (UE); and
after providing the access to the reduced-scale slice that provides access to the test function for the first plurality of UE, converting, by the cellular network, the reduced-scale slice to a production slice, wherein the production slice provides access to the cellular network for a second plurality of UE.

12. A cellular network system, comprising:
a cellular network comprising an orchestration system, wherein the cellular network is configured to:
create a test function on the cellular network;
provide access to a reduced-scale slice that provides access to the test function for a first plurality of user equipment (UE); and
after providing the access to the reduced-scale slice that provides access to the test function for the first plurality of UE and in response to a validation of the reduced-scale slice received from a client, convert the reduced-scale slice to a production slice, wherein the production slice provides access to the cellular network for a second plurality of UE.

13. The cellular network system of claim 12, wherein the cellular network is further configured to receive a cellular service request, wherein the cellular service request specifies a plurality of performance metrics to be met.

14. The cellular network system of claim 13, wherein the cellular network is further configured to create the reduced-scale slice based on the cellular service request.

15. The cellular network system of claim 12, wherein the cellular network is further configured to provide access to key performance indicators (KPIs) of the reduced-scale slice.

16. The cellular network system of claim 15, wherein the cellular network is further configured to receive a modified cellular service request following the KPIs of the reduced-scale slice being provided.

17. The cellular network system of claim 16, wherein the cellular network is further configured to, in response to the modified cellular service request, modify one or more parameters of the reduced-scale slice, the test function, or both.

18. The cellular network system of claim 16, wherein the cellular network is further configured to receive a conversion request, wherein:
the conversion request requests conversion of the reduced-scale slice to the production slice; and
conversion of the reduced-scale slice to the production slice is performed in response to the conversion request.

19. A non-transitory processor-readable medium comprising processor-readable instructions configured to cause one or more processors to:
create a test function on a cellular network;
provide access to a reduced-scale slice that provides access to the test function for a first plurality of user equipment (UE);
receiving validation of the reduced-scale slice from a client; and
after providing the access to the reduced-scale slice that provides access to the test function for the first plurality of UE and in response to the received validation of the reduced-scale slice from the client, convert the reduced-scale slice to a production slice, wherein the production slice provides access to the cellular network for a second plurality of UE.

20. The non-transitory processor-readable medium of claim 19, wherein the processor-readable instructions are further configured to cause the one or more processors to:
receive a conversion request, wherein;
the conversion request requests conversion of the reduced-scale slice to the production slice; and
conversion of the reduced-scale slice to the production slice is performed in response to the conversion request.

* * * * *